No. 845,922. PATENTED MAR. 5, 1907.
J. F. BEGOLE.
FREQUENCY AND VOLT INDICATOR.
APPLICATION FILED AUG. 31, 1906.

WITNESSES:
S. S. Stout
W. H. Alexander.

INVENTOR
J. F. Begole.
BY
Fowler & Bryson
ATTORNEYS

UNITED STATES PATENT OFFICE.

JOSHUA F. BEGOLE, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

FREQUENCY AND VOLT INDICATOR.

No. 845,922.    Specification of Letters Patent.    Patented March 5, 1907.

Application filed August 31, 1906. Serial No. 332,802.

*To all whom it may concern:*

Be it known that I, JOSHUA F. BEGOLE, a citizen of the United States, residing at the city of St. Louis, in the State of Missouri, have invented a certain new and useful Frequency and Volt Indicator, of which the following is such a full, clear, and exact description as will enable any one skilled in the art to which it appertains to make and use the same, reference being had to the accompanying drawings, forming part of this specification.

My invention relates to an indicating device or meter which will at the same time indicate both the voltage and the frequency of an alternating current. In order to accomplish this, I provide two movable indicating devices, the movement of one of which is proportional both to the frequency and the voltage of the current to be measured and the other of which has a movement proportional only to the voltage, said movements being equal and in the same direction as the movement due to the voltage in the first device, so that the relative movement between the two devices will indicate the frequency. I also provide a third indicating device coöperating with one of the first-named indicating devices to indicate the voltage.

Figure 1:
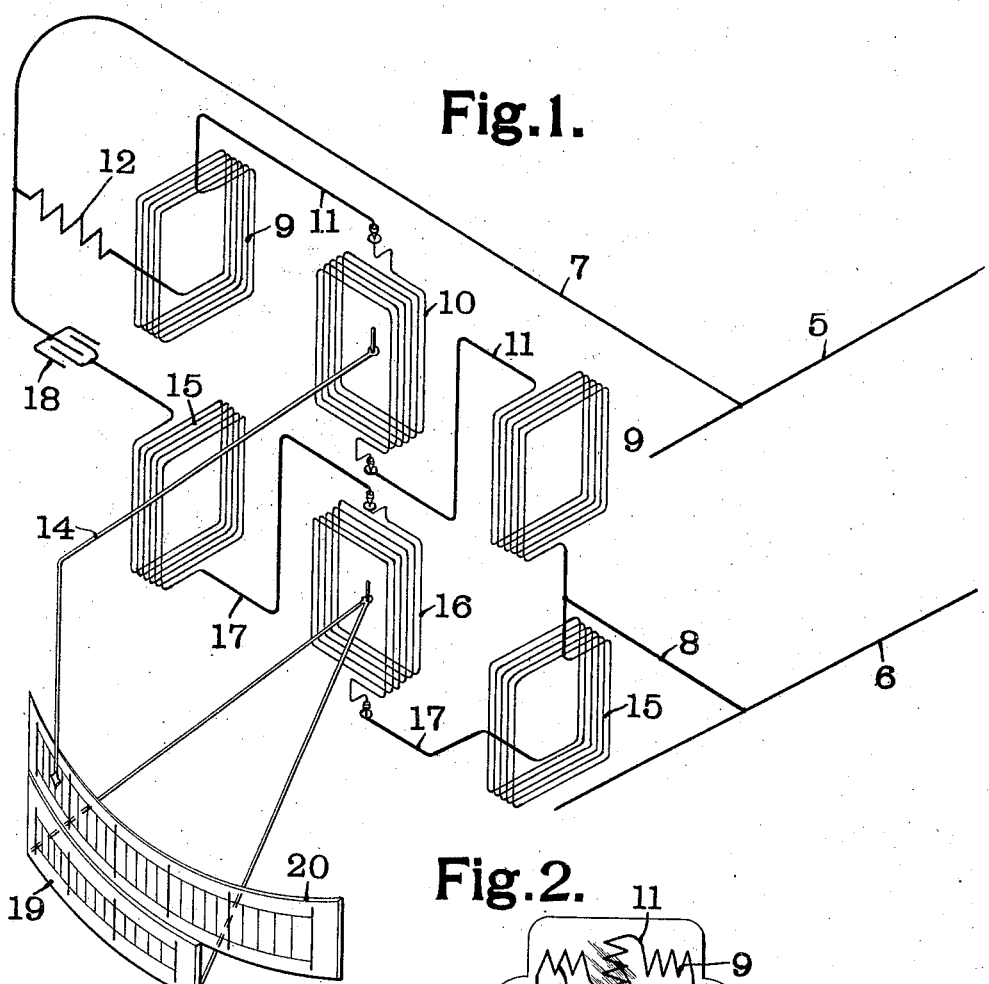
Figure 2:
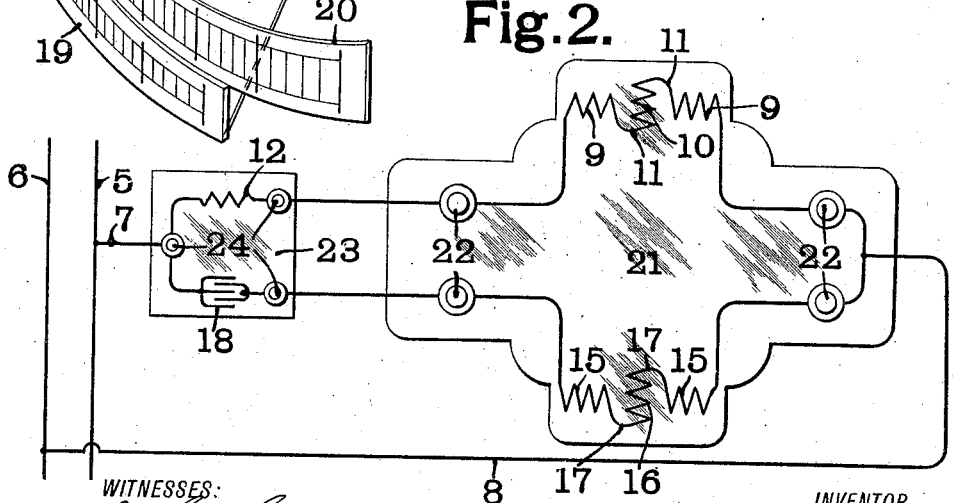

In the accompanying drawings, which illustrate one form of frequency and volt meter made in accordance with my invention, Figure 1 is a diagrammatic view in perspective, and Fig. 2 is a diagrammatic plan view, the indicating devices being omitted.

Like marks of reference refer to similar parts in both views of the drawings.

5 and 6 are the line-wires from which extend conductors 7 and 8, respectively. Connecting conductors 7 and 8 are two circuits, each of which contains a movable indicating device, as will be hereinafter described. One of the circuits connecting the conductors 7 and 8 contains a pair of fixed coils 9 and a movable coil 10. Said coils are connected by means of conductors 11, and contained in the circuit is a non-inductive resistance 12, such as is used in voltmeters. The movable coil 10 carries a pointer 14. It will be evident that the circuit above described is one such as is usual in voltmeters and that consequently the movement of the pointer 14 will be proportional to the voltage of the current in the line-wires 5 and 6. The second circuit between the conductors 7 and 8 contains two fixed coils 15 and a movable coil 16, these coils being connected by means of conductors 17, and in this second circuit is contained a condenser 18. The coils 15 and 16 are similar to the coils 9 and 10, hereinbefore described, and are symmetrically placed with respect thereto, the coils 10 and 16 being pivoted upon a coaxial line. The coil 16 will therefore have a movement equal to and in the same direction as the coil 10, due to the voltage in the said coils. In addition, however, the coil 16, owing to the presence of the condenser 18 in its circuit, will have a movement proportional to the frequency of the current in the mains 5 and 6. Carried by the coil 16 is a movable scale 19. It will be evident, therefore, that the relative movement between the pointer 14 and the scale 19 will be due only to the frequency in the lines 5 and 6 and that consequently by properly calibrating the scale 19 the frequency of the mains can be read on said scale from the relative movement of the scale and pointer. In addition to the movable scale 19 I also provide a fixed scale 20, which also coöperates with the pointer 14, and as the pointer 14 has a movement which is proportional only to the voltage of the lines 5 and 6 by properly calibrating the scale 20 the voltage can be read thereon by the movement of the said pointer 14. My meter thus serves at the same time to indicate both the voltage and the frequency of the current in the line-wires 5 and 6.

In practice I prefer to mount the fixed and movable coils, together with the indicators, on a base 21, as illustrated in Fig. 2, said base being provided with binding-posts 22, for connection with the conductors, and to mount the resistance 12 and condenser 18 on a separate base 23, provided with binding-posts 24 for connection with the conductors.

In place of the condenser 18 I may use an impedance or any other device which will cause the current of the movable coil 17 to vary with the frequency, as well as the voltage, of the current in the main line.

Having fully described my invention, what I claim as new, and desire to secure by Letters Patent of the United States, is—

1. In a frequency and volt meter, the combination with a pair of coöperating indicating devices, of means for moving one of said indicating devices proportionally to the voltage and frequency of the current to be measured, means for moving the other of said indicating devices proportionally to the voltage of the current to be measured, and a third indicating device coöperating with one of said first-named indicating devices.

2. In a frequency and volt meter, the combination with a pair of movable coils, of a pair of indicating devices coöperating to indicate frequency, one of said indicating devices being controlled by each coil, a third indicating device coöperating with one of said first-named indicating devices to indicate voltage, and means in series with one of said coils for varying the current with the frequency.

3. In a frequency and volt meter, the combination with a pair of movable coils, of a pair of indicating devices coöperating to indicate frequency, one of said indicating devices being controlled by each coil, a third indicating device coöperating with one of said first-named indicating devices to indicate voltage, and a condenser in series with one of said coils.

4. In a frequency and volt meter, the combination with a pair of movable coils, of a pair of indicating devices coöperating to indicate frequency, one of said indicating devices being controlled by each coil, a stationary indicating device coöperating with one of said first-named indicating devices to indicate voltage, and means in series with one of said coils for varying the current with the frequency.

5. In a frequency and volt meter, the combination with a pair of movable coils, of a pair of indicating devices coöperating to indicate frequency, one of said indicating devices being controlled by each coil, a stationary indicating device coöperating with one of said first-named indicating devices to indicate voltage, and a condenser in series with one of said coils.

6. In a frequency and volt meter, the combination with a pair of movable coils, of a pair of indicating devices coöperating to indicate frequency, one of said indicating devices being controlled by each coil, a third indicating device coöperating with one of said first-named indicating devices to indicate voltage, means in series with one of said coils for varying the current with the frequency, and a resistance in series with the other of said coils.

7. In a frequency and volt meter, the combination with a pair of movable coils, of a pair of indicating devices coöperating to indicate frequency, one of said indicating devices being controlled by each coil, a third indicating device coöperating with one of said first-named indicating devices to indicate voltage, a condenser in series with one of said coils, and a resistance in series with the other of said coils.

8. In a frequency and volt meter, the combination with a pair of movable coils, of a pair of indicating devices coöperating to indicate frequency, one of said indicating devices being controlled by each coil, a stationary indicating device coöperating with one of said first-named indicating devices to indicate voltage, means in series with one of said coils for varying the current with frequency, and a resistance in series with the other of said coils.

9. In a frequency and volt meter, the combination with a pair of movable coils, of a pair of indicating devices coöperating to indicate frequency, one of said indicating devices being controlled by each coil, a stationary indicating device coöperating with one of said first-named indicating devices to indicate voltage, a condenser in series with one of said coils, and a resistance in series with the other of said coils.

10. In a frequency and volt meter, the combination with a movable coil, of a movable scale controlled thereby, means in series with said coil for varying the current with the frequency, a stationary scale, a second movable coil, and a pointer controlled by said latter coil and coöperating with said movable scale to indicate frequency and with said stationary scale to indicate voltage.

11. In a frequency and volt meter, the combination with a movable coil, of a movable scale controlled thereby, a condenser in series with said coil, a stationary scale, a second movable coil, and a pointer controlled by said latter coil and coöperating with said movable scale to indicate frequency and with said stationary scale to indicate voltage.

12. In a frequency and volt meter, the combination with a movable coil, of a movable scale controlled thereby, means in series with said coil for varying the current with the frequency, a stationary scale, a second movable coil, a resistance in series with said latter coil and a pointer controlled by said second coil and coöperating with said movable scale to indicate frequency and with said stationary scale to indicate voltage.

13. In a frequency and volt meter, the combination with a movable coil, of a movable scale controlled thereby, a condenser in series with said coil, a stationary scale, a second movable coil, a resistance in series with said coil, and a pointer controlled by said second coil and coöperating with said movable scale to indicate frequency and with said stationary scale to indicate voltage.

In testimony whereof I have hereunto set my hand and affixed my seal in the presence of the two subscribing witnesses.

JOSHUA F. BEGOLE. [L. S.]

Witnesses:
W. A. ALEXANDER,
BENNETTE PIKE.